(12) United States Patent
Fioravanti

(10) Patent No.: US 6,527,332 B2
(45) Date of Patent: Mar. 4, 2003

(54) MOTORCAR WITH AN OPENABLE HARD TOP

(75) Inventor: Leonardo Fioravanti, Moncalieri (IT)

(73) Assignee: Fioravanti S.r.l., Turin (IT)

( * ) Notice: Subject to any disclaimer, the term of this patent is extended or adjusted under 35 U.S.C. 154(b) by 0 days.

(21) Appl. No.: 10/078,365

(22) Filed: Feb. 21, 2002

(65) Prior Publication Data

US 2002/0113457 A1 Aug. 22, 2002

(30) Foreign Application Priority Data

Feb. 22, 2001 (IT) .................................. T02000026 U

(51) Int. Cl.[7] ................................................. B60J 10/10
(52) U.S. Cl. ............................. 296/107.17; 296/216.02
(58) Field of Search .......................... 296/107.17, 180.1, 296/107.16, 107.07

(56) References Cited

U.S. PATENT DOCUMENTS

| | | | | | |
|---|---|---|---|---|---|
| 1,264,804 | A | * | 4/1918 | Jacobs | 296/107.17 |
| 1,940,444 | A | * | 12/1933 | Burgman | 296/107.17 |
| 1,973,220 | A | * | 9/1934 | Mohr | 446/470 |
| 2,181,869 | A | * | 12/1939 | Carr | 296/107.17 |
| 2,210,590 | A | * | 8/1940 | Jobst | 296/107.17 |
| 2,471,378 | A | * | 5/1949 | Shilala | 296/107.17 |
| D184,043 | S | * | 12/1958 | Dodge | D14/27 |
| 3,035,281 | A | * | 5/1962 | Pearson | 296/107.17 |
| 3,278,221 | A | * | 10/1966 | Jaulmes | 296/107.17 |
| 4,750,778 | A | * | 6/1988 | Hoban | 296/107.17 |
| 4,805,956 | A | * | 2/1989 | Saunders | 296/107.17 |
| 4,819,982 | A | | 4/1989 | Eyb | |
| 4,950,022 | A | * | 8/1990 | Pattee | 296/107.17 |
| 5,106,150 | A | * | 4/1992 | Litwicki | 296/216.02 |
| 5,265,930 | A | * | 11/1993 | Klein et al. | 296/107.17 |
| 6,019,416 | A | * | 2/2000 | Beierl | 296/107.17 |
| 6,033,008 | A | * | 3/2000 | Mattila | 296/107.17 |
| 6,102,771 | A | * | 8/2000 | Poznick et al. | 296/107.17 |
| 6,131,988 | A | * | 10/2000 | Queveau et al. | 296/107.17 |
| 6,315,349 | B1 | * | 11/2001 | Kinnanen | 296/107.17 |
| 6,382,703 | B1 | * | 5/2002 | Queveau et al. | 296/107.17 |
| 6,425,621 | B2 | * | 7/2002 | Miklosi et al. | 296/107.17 |
| 6,425,622 | B2 | * | 7/2002 | Eberle | 296/107.17 |
| 2001/0006297 | A1 | * | 7/2001 | Dintner et al. | 296/107.17 |
| 2001/0045759 | A1 | * | 11/2001 | Russke | 296/107.17 |
| 2002/0050727 | A1 | * | 5/2002 | Hasselgruber et al. | 296/107.17 |

FOREIGN PATENT DOCUMENTS

| | | | |
|---|---|---|---|
| FR | 2 694 246 | * | 7/1992 |
| FR | 2 696 375 | * | 10/1992 |
| JP | 62 120222 | * | 6/1987 |
| WO | WO 97/45285 A1 | | 12/1997 |

* cited by examiner

Primary Examiner—Kiran Patel
(74) Attorney, Agent, or Firm—Sughrue Mion, PLLC

(57) ABSTRACT

A motorcar with an openable hard top is of the type in which the roof (2) comprises a front portion (3) connected releasably to the upper cross-member of the windscreen (5) and a transparent rear portion (4) which is articulated about a horizontal transverse axis (6) to two side pillars (7) of the body. The roof (2) can be opened in known manner by being pivoted rearwardly about the said transverse axis (6) until it bears on the rear boot lid (10) which has two front arms (11) that extend upwards and are articulated to the body about the same horizontal transverse axis (6) about which the roof (2) is articulated. When the roof is in the closed position, the end edge (4a) of the transparent rear portion (4) of the roof (2) is situated at the same height as the bases of the two side pillars (7) of the body to which the roof (2) is articulated. The transparent rear portion (4) of the roof acts as a rear window when the roof is in the closed position, and has a curved profile such as to act as an anti-turbulence element with respect to the passengers when the roof is in the open position.

7 Claims, 3 Drawing Sheets

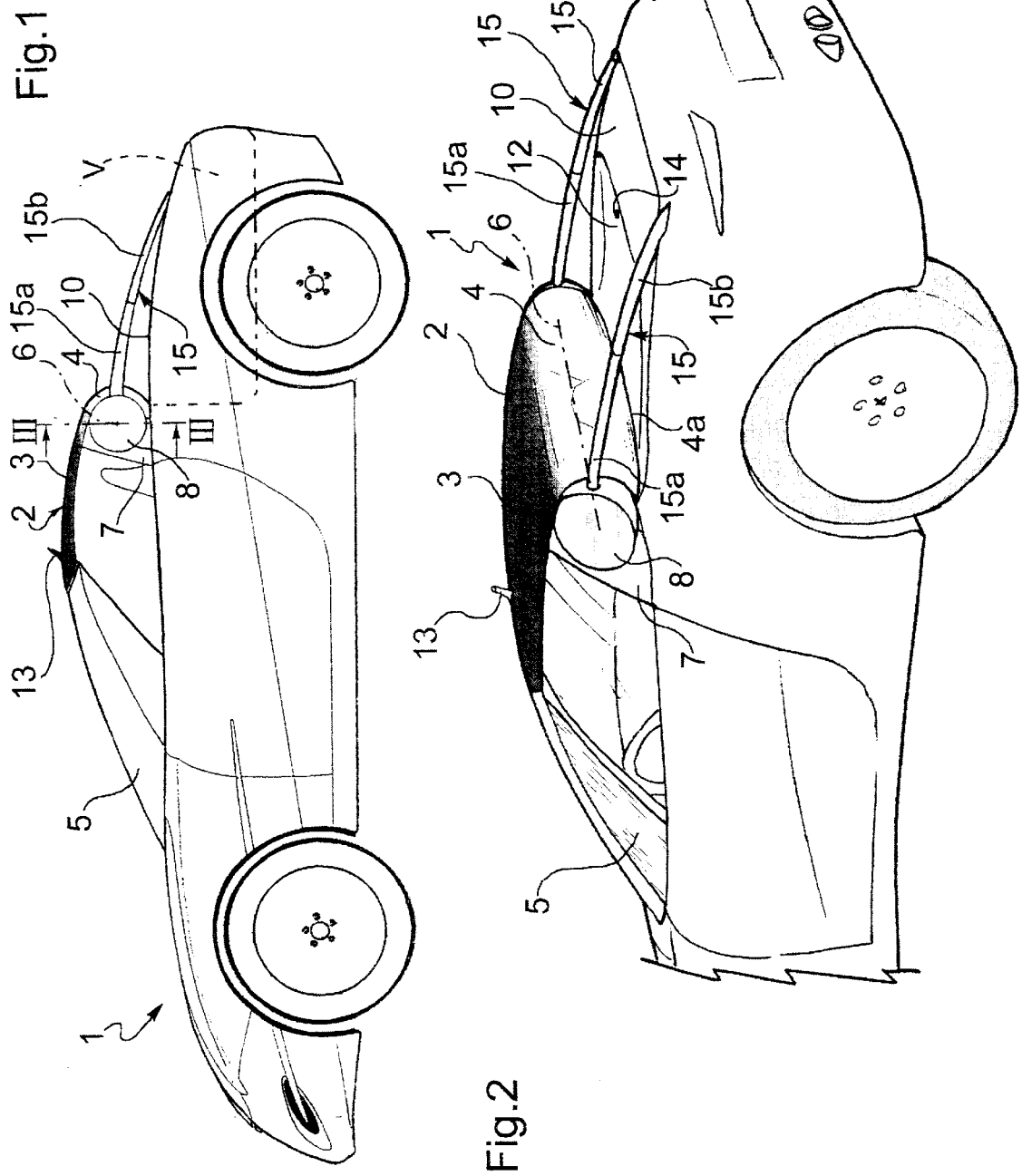

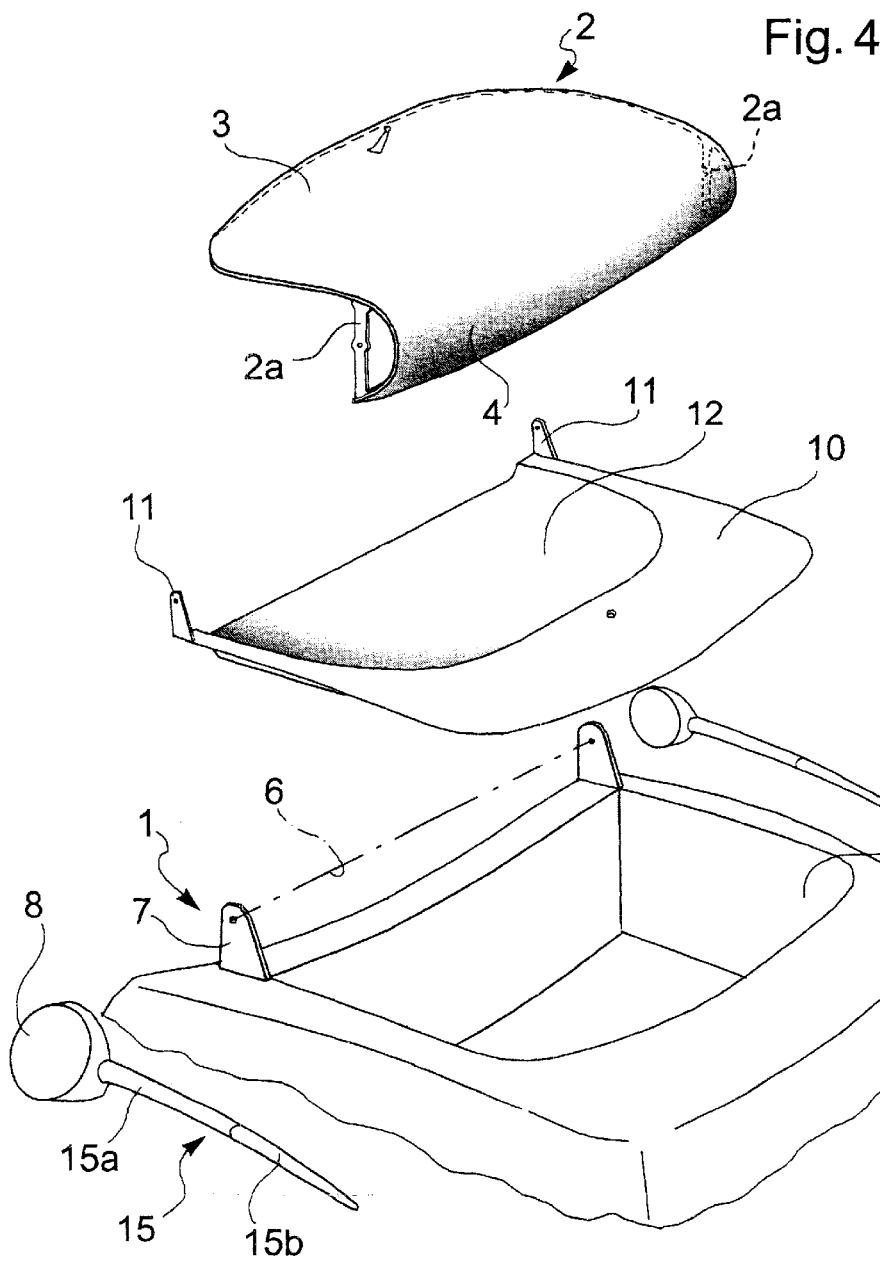

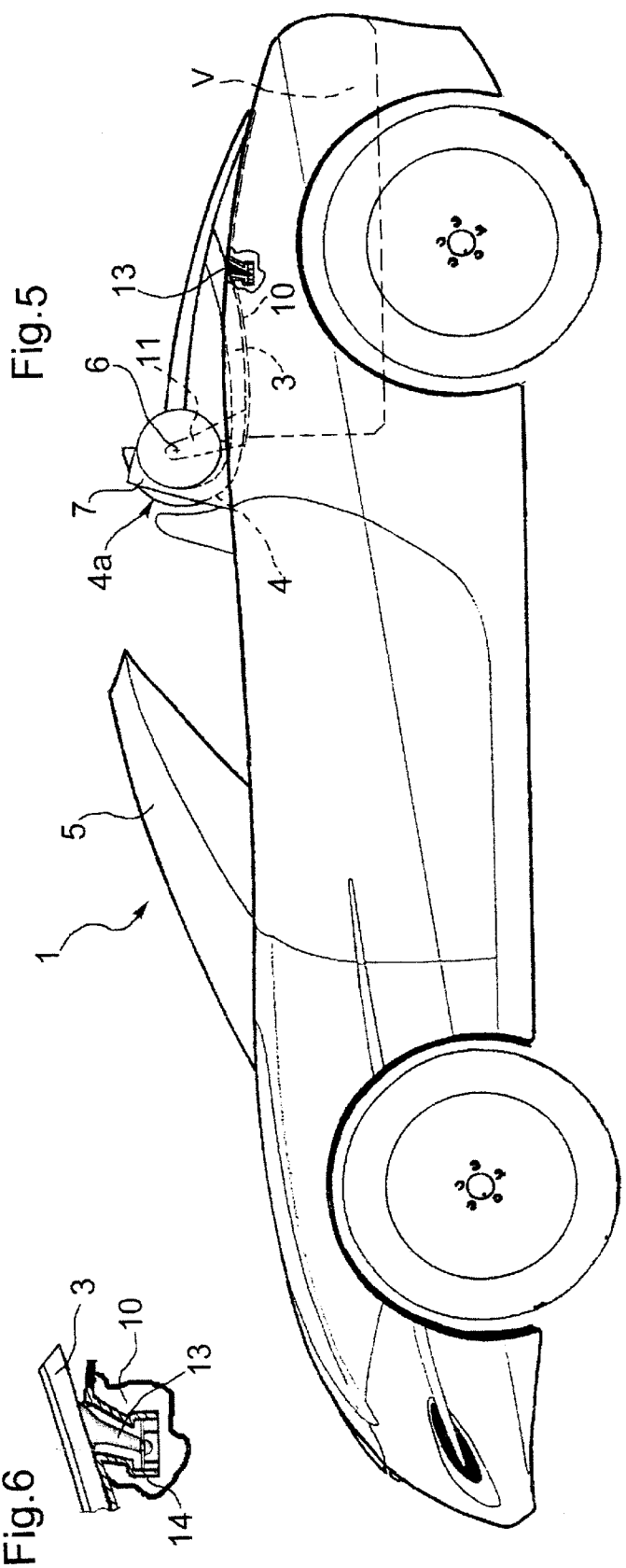

MOTORCAR WITH AN OPENABLE HARD TOP

BACKGROUND OF THE INVENTION

The present invention relates to a motorcar with an openable hard top of the type in which the roof comprises a front portion connected releasably to the upper cross-member of the windscreen and a transparent rear portion which is articulated about a horizontal transverse axis to two side pillars of the body, so that the roof can be opened by being pivoted rearwardly about the said transverse axis until it bears on the rear boot lid which has two front uprights that extend upwards and are articulated to the body about the same horizontal transverse axis about which the roof is articulated.

A motorcar provided with an openable hard top of the above-mentioned type is known from European patent No. 0 901 421.

In the motorcar according to this European patent, the rear edge of the roof is situated—when the roof is in the closed position—approximately at the height of the articulation axis of the roof, which is substantially above the waistline of the body.

The transparent rear portion of the roof cannot therefore act as a rear window.

The rear window in this case is constituted by a fixed transparent element (7) which is supported by the vehicle body. When the roof is in the open position, this fixed element has an anti-turbulence function since it prevents the passengers from being subjected to air turbulence when the vehicle is in motion.

SUMMARY OF THE INVENTION

In this solution, the window is therefore constituted by an additional fixed element which is independent of the hard top that is articulated to the body.

Moreover, when the roof is in the closed position, the transparent rear portion of the roof is positioned to the rear of the upper portion of the fixed rear window so that, should the parts not be perfectly clean—as would inevitably occur during the use of the motorcar—rearward visibility would be reduced.

To prevent the above-mentioned disadvantages of the prior art, the subject of the present invention is a motorcar with an openable top of the type mentioned above and having the characteristic which forms the subject of claim 1.

BRIEF DESCRIPTION OF THE DRAWINGS

Further characteristics and advantages of the present invention will become clear from the following description, given with reference to the appended drawings, provided purely by way of non-limiting example, in which:

FIG. 1 is a side view of a motorcar according to the invention in which the roof is shown in the closed position, FIG. 2 is a view of the rear three-quarters of the motorcar shown in FIG. 1, FIG. 3 is a cross sectional view taken on line III—III of FIG. 1, FIG. 4 is an exploded schematic view of the component parts shown in FIG. 3, FIG. 5 is a view similar to FIG. 1 in which the roof is shown in the open position, and FIG. 6 shows a detail of FIG. 5, on an enlarged scale.

DETAILED DESCRIPTION OF THE INVENTION

As shown in FIG. 1, a motor vehicle, indicated 1, has a roof 2 having a front portion 3 and a transparent rear portion 4. The roof 2 is preferably formed in a single piece and is produced by moulding of a transparent plastics material. The front portion 3 may be rendered permanently opaque by spray painting or metallization.

Alternatively, the front portion 3 may be obscured temporarily, in known manner, by a liquid-crystal system controlled remotely from the driving position.

The front portion 3 of the roof 2 is connected releasably to the upper cross-member of the windscreen 5 and the rear portion 4 is articulated about a horizontal transverse axis 6 to two pillars 7 which extend upwards from the waistline of the body.

For this purpose each of the two side edges of the rear portion of the roof is provided, as shown in FIGS. 3 and 4, with a supporting element 2a having a central bore for a hinge pin P shown in FIG. 3.

As shown in particular in FIG. 2, when the roof 2 is in the closed position, the transparent rear portion 4, which has a curved profile, extends downwards below the articulation axis 6 and its lower edge 4a is situated at approximately the same height as the bases of the two side pillars 7.

When the roof is in this closed position, the curved portion 4 which has a concave surface facing towards the passenger compartment of the vehicle, acts as a rear window.

In the embodiment shown, the rear portion 4 of the roof has a profile with dual curvature, since it is curved both in a side view and in a plan view.

A cylindrical housing 8 is fixed to the outer surface of each of the two pillars 7. One of the two housings 8 contains an actuator device of known type, operable by a remote control from the driver's seat, in order to pivot the roof 2 about the axis 6 so as to move the roof from the closed position to the open position and vice versa. This actuator device may be constituted, for example, by an electric motor connected to an epicyclic reducer.

The other housing 8 preferably contains the cap for closing the pipe for supplying fuel to the vehicle's tank.

A rear boot lid, indicated 10, closes the top and the rear portion of the luggage compartment V which is shown in broken outline in FIGS. 1 and 5. The boot lid 10 has, at its front end, two upwardly-extending, inclined arms 11 (FIGS. 3 and 4) which are articulated to the two pillars 7 of the body about the same articulation axis 6 as the roof 2. As shown in FIG. 3, the upper end of each arm 11 is articulated between the respective pillar 7 and the supporting element 2a of the rear portion 4 of the roof 2 about the respective hinge pin P.

The rear boot lid 10 has, in its upper surface, a central recess 12 forming a seat which conforms to the profile of the roof and in which the roof 2 is housed when it is pivoted rearwardly about the axis 6 to its open position, shown in FIG. 5. In this position, an appendage 13 carried by the front portion 3 of the roof 2 and acting as a receiving and transmitting antenna, is engaged resiliently, as shown in particular in FIG. 6, in a corresponding seat 14 carried by the rear boot lid 10. When the roof 2 is in the open position, the rear boot lid 10 can thus be opened, carrying with it the roof 2 which is connected to the lid in the manner indicated above. When the roof is in the closed position shown in FIG. 1, the rear boot lid 10 can be opened without interfering with the roof 2.

When the roof is in the open position shown in FIG. 5, the convex surface of the curved rear portion 4 of the roof 2 faces the passenger compartment of the vehicle and, when the vehicle is in motion, constitutes an aerodynamic profile which directs the air-flow threads, achieving an anti-turbulence (anti-buffeting) effect, that is, preventing the formation of air turbulence which would constitute a nuisance to the passengers.

The transparent rear portion 4 of the roof 2 thus performs a dual function since:

when the roof is closed it acts as a rear window, when the roof is open it also acts as an anti-turbulence surface.

Each of the two cylindrical housings 8 is also connected to the rear portion of the body by means of an inclined longitudinal bar 15. The front portions 15a of the two bars 15 act as load-carriers, for example, for supporting a ski rack, whereas the rear portions 15b are formed so as to act as rear direction indicators.

What is claimed is:

1. A motorcar with an openable hard top, of the type in which the roof (2) comprises a front portion (3) connected releasably to the upper cross-member of the windscreen (5) and a transparent rear portion (4) which is articulated about a horizontal transverse axis (6) to two side pillars (7) of the body, so that the roof (2) can be opened by being pivoted rearwardly about the said transverse axis (6) until it bears on the rear boot lid (10) which has two front arms (11) that extend upwards and are articulated to the side pillars (7) of the body about the same horizontal transverse axis (6) about which the roof is articulated (2), characterized in that, when the roof is in the closed position, the end edge (4a) of the rear portion (4) of the roof (2) is situated substantially at the same height as the bases of the two side pillars (7) of the body to which the roof (2) is articulated, and in that the transparent rear portion (4) of the roof acts as a rear window when the roof is in the closed position, and has a profile such as to act as an anti-turbulence element with respect to the passengers of the vehicle when the roof is in the open position.

2. A motorcar according to claim 1, characterized in that the rear portion (4) of the roof is curved and, when the roof is in the closed position, has a concave profile facing towards the passenger compartment of the vehicle.

3. A motorcar according to claim 1, characterized in that the rear portion (4) of the roof has a profile with dual curvature.

4. A motorcar according to claim 1, characterized in that the front portion (3) of the roof has an appendage (13) suitable for engaging a corresponding seat (14) of the rear boot lid (10) when the roof is in the open position.

5. A motorcar according to claim 1, characterized in that there is fixed externally to at least one of the two side pillars (7) of the body a housing (8) containing a drive mechanism for pivoting the roof (2) from the open position to the closed position and vice versa.

6. A motorcar according to claim 5, characterized in that each of the two side pillars (7) carries a housing (8) and in that one of the two housings (8) contains a drive mechanism and the other housing contains the cap of the vehicle's tank.

7. A motorcar according to claim 6, characterized in that each of the two housings (8) is connected to the rear portion of the body by means of an inclined longitudinal bar (15), each of the bars (15) having a front portion (15a) acting as a load carrier and a rear portion (15b) acting as a rear direction indicator.

* * * * *